Aug. 7, 1923.
T. W. HALL
OVERHEAD ARM SUPPORT FOR MILLING MACHINES
Filed May 17, 1922
1,464,266
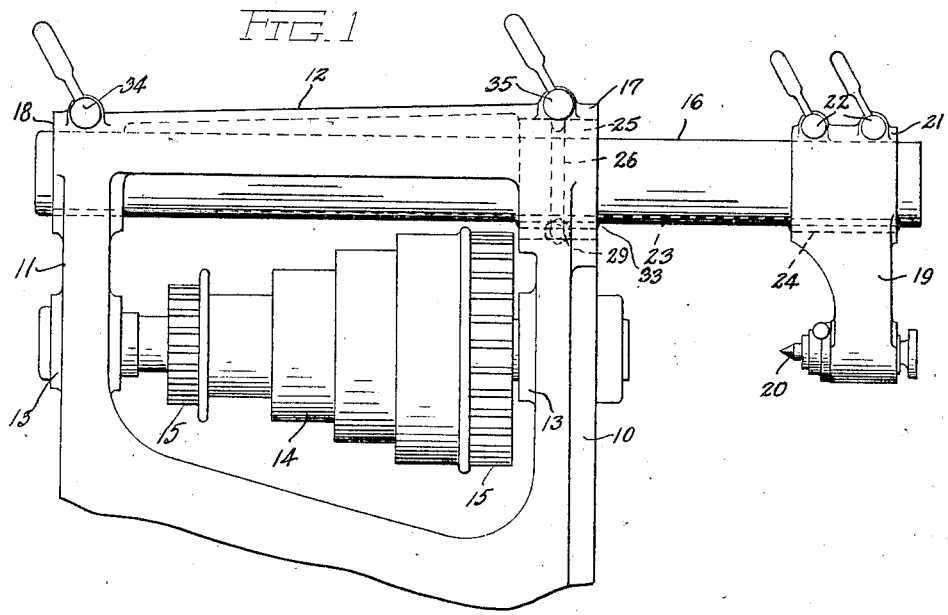
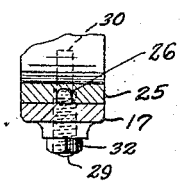
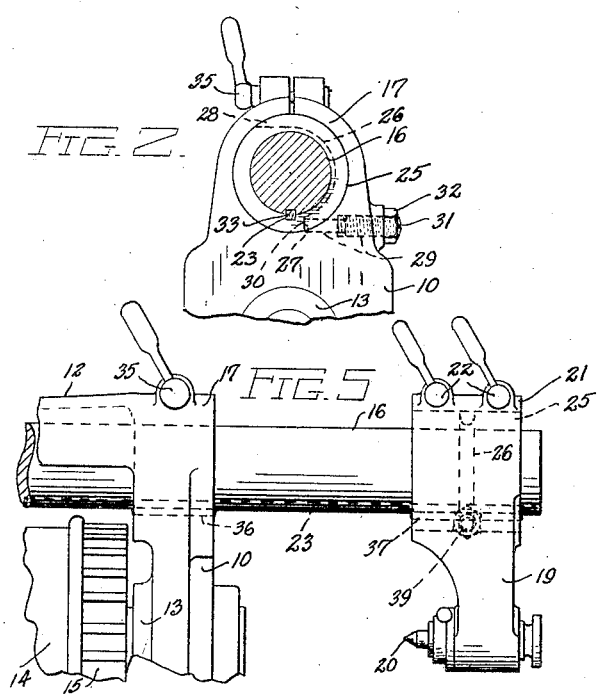
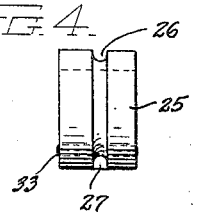
INVENTOR.
Thomas W. Hall
BY Wooster & Davis
ATTORNEYS.

Patented Aug. 7, 1923.

1,464,266

UNITED STATES PATENT OFFICE.

THOMAS W. HALL, OF TORRINGTON, CONNECTICUT.

OVERHEAD-ARM SUPPORT FOR MILLING MACHINES.

Application filed May 17, 1922. Serial No. 561,624.

*To all whom it may concern:*

Be it known that I, THOMAS W. HALL, a citizen of the United States, residing at Torrington, county of Litchfield, State of Connecticut, have invented an Improvement in Overhead-Arm Supports for Milling Machines, of which the following is a specification.

This invention relates to machine tools and particularly to the overhead arm support for milling machines, and it is an object of the invention to provide an improved and simple means for mounting the overhead arm whereby the depending arbor support may be quickly shifted for removal of the arbor and the milling cutters, and for quickly centering the same and securing it in alignment with the axis of the arbor in mounting the cutters in the machine.

With these and other objects in view I have devised the improved structure illustrated in the accompanying drawing, in which—

Fig. 1 is a side elevation of an overhead arm for a milling machine and its support.

Fig. 2 is an end view of the support from the right hand of Fig. 1, the arm being shown in section.

Fig. 3 is a sectional view through one side of the adjustable sleeve and its bearing, Fig. 4 is a side elevation of the adjustable sleeve, and Fig. 5 is a side elevation of a modified construction.

The usual spaced uprights 10 and 11 are connected at their tops by the connecting bar 12 and carry the usual bearings 13 for the driving pulleys 14 and gears 15 respectively for the milling cutters. Above this pulley is mounted the overhead arm 16 which is preferably a cylindrical bar and it is adjustably supported in the uprights 10 and 11 by a split bearing 17 and 18. It carries the usual depending arbor support 19 which is adjustable on this arm and may be clamped thereto in adjusted position and carries the center 20 to support one end of the arbor. This depending support has the usual split bearing 21 embracing the overhead arm with the usual clamping screws 22 to clamp it to the arm in adjusted position. This support, however, is not adapted to be turned around the arm as the arm is provided with a keyway 23 extending longitudinally thereof with a key 24 secured in the support and having sliding engagement with the key way.

In the split bearing 17 is mounted a sleeve 25 embracing the overhead arm 16, this sleeve or bushing having in its periphery a milled groove 26, extending substantially as shown in Fig. 2 ending in a shoulder 27 at one side and running out at 28 on the other side. Extending from the rear side of the bearing 17 is an adjustable stop screw 29 having threaded engagement in the bearing and having an inner end 30 adapted to engage the shoulder 27 to limit the turning movement of the sleeve or bushing 25, the end of this screw extending into the groove 26 and retaining the bushing in the bearing 17. This stop screw has threaded engagement in the walls of the bearing for adjustment therein by any suitable means, such as a slot 31 in its end and may be secured in adjusted position by means of a lock nut 32. Secured in this bushing is a key 33 having sliding engagement with the key way 23 so that this bushing will turn with the overhead arm but the arm may be slid longitudinally within the bushing.

The operation is as follows:

By loosening the clamping screws 34 and 35, the arm 16 is released whereby it may be adjusted in the uprights 10 and 11 longitudinally and also may be rotated to swing the arbor support 19 toward the operator for insertion and removal of the milling cutters. Rotation of the arm will also rotate the sleeve or bushing 25 in the split bearing 17 on the upright 10. Swinging the support 19 in the opposite direction until the shoulder 27 contacts with the end 30 of the stop screw 29 will bring the center 20 into alignment with the axis of the pulley 14 and the arbor to be supported, and it may then be moved into position to support the arbor. Tightening of the clamping screws 34 and 35 will secure the arm in adjusted position. It will be noted the clamping screw 35 clamps the split bearing 17 about the outside of the sleeve or bushing 25 so that an increased bearing surface is secured over what would be possible if the bearing were clamped directly about the arm, and thus a much stronger holding effect is secured. If the end of the stop screw 29 or the shoulder 27 should become worn it may be compensated for to render the device always accurate by a slight adjustment of the screw in the upright 10. It will thus be seen with this device the centering operation for the center 20 is a very simple one and may be accomplished without loss of time.

In the modification shown in Fig 5, the sleeve 25 instead of being placed in the split bearing 17 is placed in the bearing 21 for the arbor support 19. The arm 16 is provided with a longitudinal key way 23, as in the first form, but is held against turning within the bearing 17 and 18 by a key 36 in the bearing 17. There is also a key 37 extending partly in the bushing 25 and the key way 23 to prevent turning of the bushing relative to the arm 16, but when the clamping means 22 is released, the arm or arbor support 19 may be turned on the bushing in one direction. The bushing has a groove 26 in its periphery, as in the first form, ending at one end in a stop shoulder 27, and the stop screw 39 is the same as the stop screw 29 in the first form and is secured in the arm 19 in the same manner. When the arm 19 is swung in this form to allow removal or insertion of the milling cutters, the bushing 25 remains stationary and the stop screw 39 moves with the arm. When the arm is swung back in position, after removal or insertion of the milling cutters, the end of the screw 39 contacts the shoulder 27 and limits the movement of the arm stopping the center 20 carried thereby in alignment with the centers of the cutters, the same as in the first form, as will be obvious.

Having thus described the nature of my invention what I claim is:

1. In a machine of the character described the combination of a support having a bearing, a bushing in said bearing, said bushing and bearing being adapted for relative turning movement, an arm mounted in said bushing, means for securing the bushing to the arm so arranged as to allow relative longitudinal movement between the bushing and arm but prevent relative turning movement therebetween, stop means for limiting relative turning movement between the bearing and bushing in one direction, and means for securing said elements against relative turning movement.

2. In a machine of the character described the combination of a support having a split bearing, a bushing in said bearing, said bushing and bearing being adapted for relative turning movement, stop means for limiting said relative turning movement in one direction, an arm mounted in said bushing, said arm and bushing being adapted for relative longitudinal movement, means to secure the bushing to the arm to prevent relative turning movement, and means for clamping the bearing about the bushing.

3. In a machine of the character described the combination of a support having a bearing, a bushing mounted in said bearing, said bushing and bearing being adapted for relative turning movement, said bushing having a groove extending part way around its outer periphery and terminating at one end in a shoulder, means carried by the support adapted to coact with said shoulder to limit the relative turning movement, an arm, said arm and bushing being adapted for relative longitudinal adjustment but secured against relative turning movement, and means for securing the elements in adjusted position.

4. In a machine of the character described the combination with a support having a bearing, a bushing mounted in said bearing and adapted for turning movement therein, an arm mounted in said bushing and adapted for longitudinal adjustment therein, means to prevent turning of the arm in the bushing, said bushing being provided with a groove extending part way around its outer periphery and terminating at one end in a shoulder, adjustable means carried by the support and adapted to coact with said shoulder to limit the turning movement of the bushing, and means for securing the bushing against movement in the bearing.

5. In a machine of the character described the combination of a support having a bearing, a bushing in said bearing and adapted for turning movement therein, an arm mounted in said bushing and adapted for longitudinal movement but not turning movement therein, means to limit the turning movement of the bushing in the bearing in one direction, and means for securing the arm in adjusted position.

6. In a machine of the character described the combination with a support having a split bearing, a bushing mounted in said bearing and adapted for turning movement therein, an arm extending through said bushing, said bushing being connected to the arm to allow longitudinal adjustment of the arm but prevent turning movement in the bushing, said bushing being provided with a groove extending part way around its outer periphery and terminating at one end in a shoulder, adjustable means carried by the support and adapted to coact with the shoulder to limit the turning movement of the bushing, and means to clamp the bearing about the bushing.

7. In a machine of the character described a support having two spaced bearings, a bushing in one of said bearings and adapted for turning movement therein, an arm mounted in the bushing and other bearing and adapted for longitudinal adjustment in the bushing but secured against turning movement therein, stop means to limit the turning movement of the bushing in its bearing, means for securing the bushing against movement in its bearing, and means for securing the arm against movement in the other bearing.

8. In a machine of the character described a support having a bearing, a bushing in said bearing adapted for turning movement therein, an arm mounted in said bushing and having a longitudinally extending key way, a key carried by the bushing and slidable in said key way, means for limiting turning movement of the bushing in one direction, and means for securing the bushing in adjusted position.

9. In a machine of the character described the combination of a support having a split bearing, a bushing in said bearing and adapted for turning movement therein, an arm extending through said bushing and having a longitudinally extending key way, a key carried by the bushing and slidable in said key way, said bushing having a groove extending part way around the outer periphery thereof and terminating at one end in a shoulder, a stop screw adjustably mounted in the support and adapted to coact with said shoulder to limit the turning movement of the bushing in the bearing, and means for clamping the bearing about said bushing.

10. In a machine of the character described the combination of a support having a pair of split bearings, a bushing in one of said bearings and adapted for turning movement therein, an arm extending through said bushing and the other bearing and provided with a longitudinally extending key way, a key carried by the bushing and slidable in said key way, said bushing having a groove extending part way around its outer periphery and terminating at one end in a shoulder, a stop screw adjustably mounted in the support and adapted to coact with said shoulder to limit the turning movement of the bushing in its bearing, means for clamping its bearing about the bushing, and means for clamping the other bearing about the arm.

11. In a machine of the character described a support having a bearing, an arm extending in said bearing, an arbor support also having a bearing in which the arm extends, a bushing between one of said bearings and the arm and so arranged that there may be relative rotation between the bushing and the bearing, coacting means carried by the bushing and bearing to limit said relative rotation in one direction, and means for preventing rotation of the bushing relative to the arm.

12. In a machine of the character described a support having a bearing, an arm extending in said bearing, an arbor support also having a bearing in which the arm extends, a bushing on the arm and located in one of said bearings and so arranged that there may be relative rotation between the bushing and the bearing, said bushing being provided with a circumferential groove in its outer periphery terminating at one end in a shoulder, an adjustable screw carried by the bearing and adapted to coact with said shoulder to limit said relative rotation in one direction, and coacting key and key slot means between the arm and the bushing and between the arm and the other bearing to prevent relative rotation therebetween.

In testimony whereof I affix my signature.

THOMAS W. HALL.